United States Patent Office 3,044,468
Patented July 17, 1962

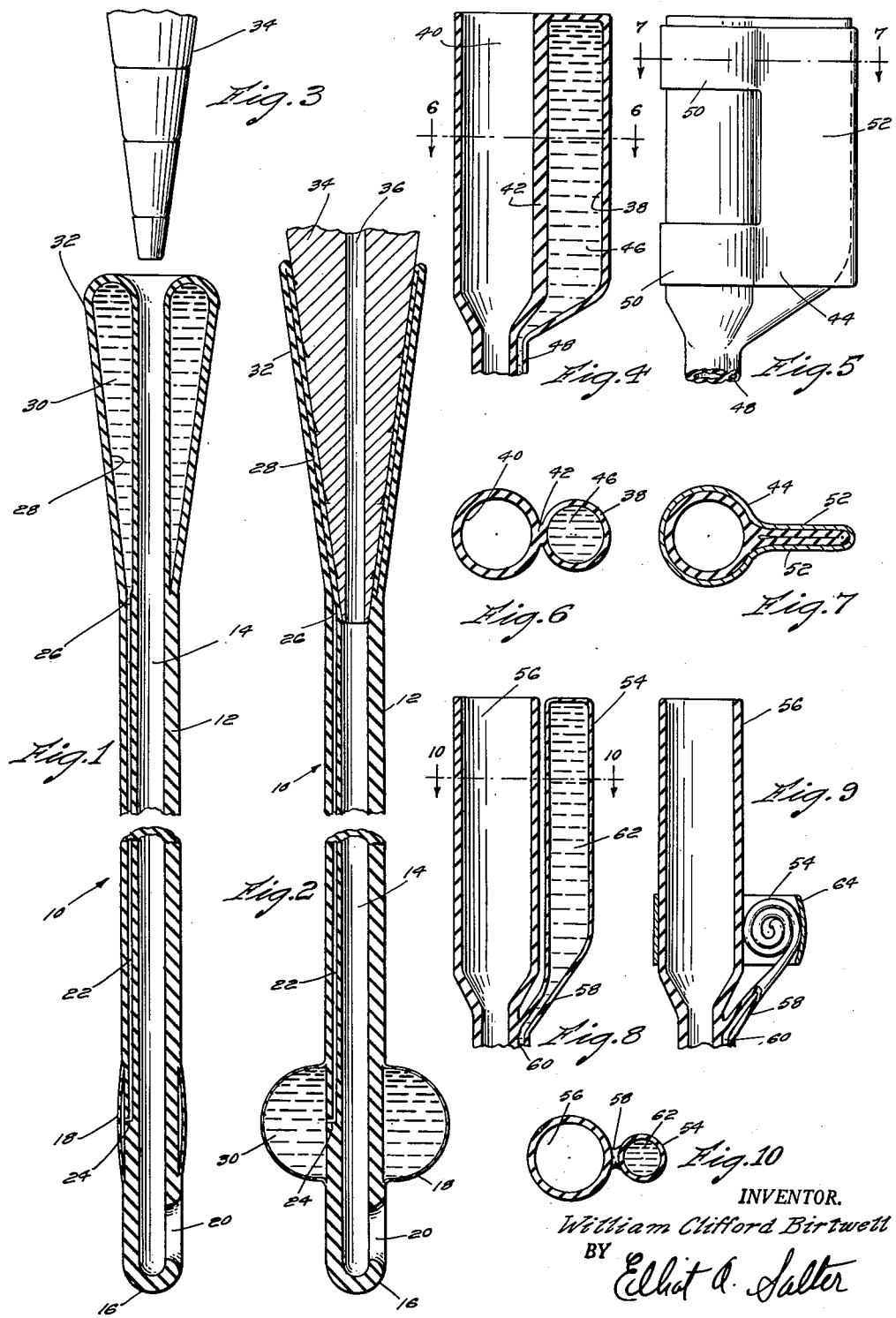

3,044,468
CATHETER HAVING BUILT-IN INFLATION MEANS
William Clifford Birtwell, North Scituate, R.I., assignor to Davol Rubber Company, Providence, R.I., a corporation of Rhode Island
Filed Dec. 1, 1958, Ser. No. 777,276
9 Claims. (Cl. 128—349)

The present invention relates generally to surgical apparatus and is more specifically concerned with retention catheters and the like.

The conventional retention catheter traditionally comprises an elongated flexible shaft having a main lumen extending therethrough and having an inflatable retention balloon mounted adjacent the distal end of said shaft. An inflating lumen extends through said shaft into communication with the balloon whereby fluid under pressure may be forced through said inflating lumen to distend the balloon. The inflating means usually comprises some sort of separate and distinct equipment, such as a syringe or hypodermic, which is interengaged with the free proximal end of the inflating lumen.

The above described inflating system has proven to be disadvantageous for numerous reasons. First of all, before the balloon can be inflated it is essential that the necessary inflating equipment be available. Thus, if for any reason a syringe, hypodermic or other inflating device does not happen to be present during catheterization of the patient, or if such inflating means have inadvertently become misplaced, ti is virtually impossible to inflate the catheter balloon. And even where such inflating equipment is available, there is always the possibility that the balloon will be either under- or overinflated since the degree of inflation is completely within the control of the operator.

Another important disadvantage which exists in the inflation of prior art catheters is the fact that once the catheter balloon has been inflated, some sort of a seal or the like is necessary to maintain the inflation. This not only requires an additional device, but there also is the problem of effectively sealing the balloon in its inflated condition since, if a slow leak exists through the inflation lumen, there will be no visual indication that the balloon is not completely inflated, particularly where the inflating medium is air.

And lastly, where the inflation is provided by an outside source there is always the problem of making sure that the inflating medium is properly sterilized.

In order to oevrcome the afore-listed disadvantages, it is a primary object of my invention to provide a retention catheter or the like having a built-in inflation system.

Another important object of this invention is the provision of a retention catheter or the like which may be inflated without the use of specialized inflating equipment such as a syringe, hypodermic or the like.

Another object is the provision of a catheter of the character described so constructed as to positively prevent overinflation of the catheter balloon.

A further object is the provision of a retention catheter or the like which is more easily and effectively maintained in its inflated condition.

Still another object is the provision of a device of the character described wherein the extent of balloon inflation is always readily visible from a point outside the catheterized patient.

An additional object is the provision of a retention catheter or the like having a built-in inflation system whereby the sterility of the inflating medium is always insured.

It is also an important object of my invention to provide a retention catheter wherein the catheter balloon will automatically be inflated upon introduction of a connecting tube to the proximal end of the catheter.

A further object of this invention is the provision of a retention catheter of the character described which is feasible for production manufacture and which is also highly efficient in use.

Other objects, features and advantages of the invention will become apparent as the description thereof proceeds when considered in connection with accompanying illustrative drawings.

In the drawings which illustrate the best mode presently contemplated by me for carrying out my invention:

FIG. 1 is a elevational section of a catheter embodying my invention, the catheter being shown in deflated condition;

FIG. 2 is an elevational section illustrating the catheter of FIG. 1 in inflated condition;

FIG. 3 is a fragmentary elevation illustrating the conical end of the connecting tube which is introduced to the catheter of FIGS. 1 and 2 to inflate same;

FIG. 4 is a fragmentary elevational section showing the proximal end of a slightly modified catheter construction, the catheter being shown in its deflated position;

FIG. 5 is a fragmentary elevation illustrating the catheter of FIG. 4 in its inflated position;

FIG. 6 is a section taken on line 6—6 of FIG. 4;

FIG. 7 is a section taken on line 7—7 of FIG. 5;

FIG. 8 is a fragmentary elevational section of another modification of my invention, the catheter being shown in its deflated position;

FIG. 9 is a fragmentary elevation, partly in section, illustrating the catheter of FIG. 8 in its inflated position; and FIG. 10 is a section taken on line 10—10 of FIG. 8.

Referring now to the drawings, and more particularly to FIGS. 1 through 3 thereof, there is shown generally at 10 a catheter of the so-called retention type having an elongated flexible shaft 12 through which extends a main lumen 14. The catheter 10 is preferably of rubber construction and may be made by a series of latex dips although it will be understood that the techniques employed in the manufacture of my catheter form no part of the instant invention. It will further be understood that it is not essential that the catheter be constructed of rubber since the only requirement is that it have sufficient flexibility to enable effective catheterization of the patient to be accomplished without causing undue discomfort, and in this respect it has been found that various plastics, such as polyvinyl, polyethylene, and polyurethane, lend themselves to the manufacture of catheters of this type.

Adjacent to but spaced from the distal end 16 of catheter 10 there is provided an inflatable balloon 18, said balloon being shown in its deflated condition in FIG. 1. Balloon 18 may be cemented to the shaft 12, although I prefer to utilize the manufacturing technique set forth in United States Patent No. 2,320,157. Distally of balloon 18 there is provided a drainage eye 20, and, as will be readily seen, said drainage eye communicates with main lumen 14.

In order to inflate the balloon 18, there is provided an inflating lumen 22 extending longitudinally of shaft 12 and communicating with the interior of balloon 18 as at 24. At its proximal end 26 the inflating lumen 22 communicates with an enclosed reservoir 28 containing an inflating medium 30. As will be seen most clearly from FIG. 1, catheter 10 is provided at its proximal end with a funnel portion 32, said funnel portion being hollow whereby to define the annular reservoir 28. Thus, when a conical connector 34 having an internal bore 36 is thrust into the interior of funnel portion 32, as illustrated in FIG. 2, the reservoir 28 is depressed whereby the inflating medium 30 is forced through inflating lumen 22 to balloon 18, thereby inflating the latter. It therefore will be apparent that balloon 18 is automatically inflated upon introduction of connector 34 to the proximal end of catheter 10, and said balloon will remain inflated so long as the connector remains in its assembled position.

In FIGS. 4 through 7 a slightly modified form of my invention is shown wherein the inflating reservoir 38 is of substantially cylindrical configuration and is located to one side of the enlarged catheter proximal end 40. Reservoir 38 is preferably integrally connected to funnel portion 40 throughout its length as at 42 whereby a specially designed clamp 44 may be applied to depress the reservoir 38 forcing the inflating medium 46 therefrom through inflating lumen 48 to inflate the balloon in a manner thought to be obvious.

More specifically, clamp 44, which may be of either metal or plastic construction, comprises a pair of spaced ring portions 50 merging with a pair of closely spaced walls 52. Thus, as the ring portions 50 are slid downwardly over the enlaged catheter proximal end 40, the adjacent walls 52 will function to depress reservoir 38 in a manner thought to be obvious.

Referring now to FIGS. 8 through 10, still another form of my invention is illustrated. In this form of my invention the inflating reservoir 54 once again assumes a substantially cylindrical configuration, but, as will be noted, said reservoir is not connected to the enlarged catheter proximal end 56. Quite to the contrary, the only connection which exists between reservoir 54 and the catheter is at the lowermost end of the former, it being noted that said reservoir merges as at 58 and integrally connects with inflating lumen 60. In the use and operation of this form of my invention, it is contemplated that reservoir 54 will be rolled up upon itself, as illustrated in FIG. 9, whereupon the inflating medium 62 contained therein will be forced into and through inflating lumen 60 to inflate the catheter balloon. In order to retain reservoir 54 in its rolled-up position and hence maintain the catheter balloon inflated, a suitable clamp 64 may be provided, which clamp is adapted to cooperate with the rolled-up reservoir in the manner clearly shown in FIG. 9.

One problem which has existed in the perfecting of the instant invention has been occasioned by the fact that where the catheter is of rubber construction, the inflating medium must be carefully chosen because of the tendency of the rubber to absorb most liquids thereby resulting in a loss or decrease of the desirable physical characteristics of the rubber and even occasionally causing a deterioration of the rubber, such as swelling or the like. In addition, the inflating medium must be nontoxic and entirely safe from a sanitary and surgical standpoint should the catheter balloon ever inadvertently break when inside a patient. It has therefore been found, and this constitutes an important part of the instant invention, that silicone oils, glycerine, and polyalkylene have proven, in that order, to be the most acceptable. Another important feature which must be considered when selecting a proper inflating medium is the fact that the viscosity of the fluid must be such as to enable the fluid to be readily forced through the inflating lumen into the balloon. In this respect, the low viscosity silicone oils of 5-10 centistokes have proven to be the most acceptable. Thus, particularly where the catheter is of rubber, the inflating medium must be carefully chosen so that it does not react unfavorably with the material of which the catheter is constructed so that it has the proper viscosity, and so that it is physioloically acceptable. As above indicated, accelerated life tests have proven that silicone oils, glycerine, and polyalkylene meet these requirements.

As hereinbefore indicated, the manufacturing techniques employed in the construction of my novel and improved catheter form no part of the instant invention, and it will be understood that various modes of manufacture may be utilized. For example, it is possible to introduce the inflating medium to the catheter during the manufacture and formation of the latter or, in the alternative, the inflating medium may be introduced to the catheter reservoir through a specially provided aperture, after which the aperture would, of course, be effectively sealed.

Thus, it will be seen that there has been provided in accordance with my invention a catheter which successfully achieves the various objects hereinbefore enumerated. More specifically, my built-in inflation system, no matter which form the structure may take, insures that the catheter balloon may always be inflated without the necessity of having available any specialized inflating equipment such as syringes, hypodermics or the like. Also, the amount of inflating medium in the catheter limits the degree of inflation of the balloon, thereby positively preventing overinflation of the latter. Then, too, once the properly sterilized inflating medium has been sealed within the catheter, there is no possibility of this medium ever becoming non-sterile. And lastly, if for any reason the balloon should inadvertently commence to deflate, such deflation would be readily and visually discernible externally of the patient since the reservoir at the proximal end of the catheter would show some degree of inflation. It might be pointed out that the actual degree of inflation of the balloon is not critical although normally the contents of the inflation system will be approximately 5 ccs. In some cases, however, 30 ccs. may be used.

While there is shown and described herein certain specific structure embodying the invention, it will be manifest to those skilled in the art that various modifications and arrangements of the parts may be made without departing from the spirit and scope of the underlying inventive concept and that the same is not limited to the particular forms herein shown and described except insofar as indicated by the scope of the appended claims.

I claim:

1. A catheter comprising an elongated flexible shaft having a proximal end and a distal end, a main lumen extending longitudinally through said shaft, an inflatable balloon on said shaft adjacent the distal end thereof, an inflating lumen extending longitudinally of said shaft and communicating with said balloon, a funnel portion at the proximal end of said shaft for receiving a connecting tube, and a built-in, depressible, fluid-containing reservoir located adjacent said funnel portion and communicating with said inflating lumen, whereby depressing said reservoir forces the fluid contained therein through said inflating lumen to said balloon to inflate the latter, said inflating reservoir extending peripherally around said funnel portion.

2. The catheter of claim 1 further characterized in that said inflating reservoir comprises an elongated, substantially cylindrical chamber connected throughout its length to one external side of said funnel portion and extending longitudinally thereof.

3. In combination, a catheter comprising an elongated flexible shaft having a proximal end and a distal end, a main lumen extending longitudinally through said shaft, an inflatable balloon on said shaft adjacent the distal end thereof, an inflating lumen extending longitudinally of said shaft and communicating with said balloon, a funnel portion at the proximal end of said shaft for receiving a connecting tube, built-in, depressible, fluid-containing reservoir located adjacent said funnel portion and communicating with said inflating lumen, whereby depressing said reservoir forces the fluid contained therein through said inflating lumen to said balloon to inflate the latter, said inflating reservoir comprising an elongated, substantially cylindrical chamber connected throughout its length to one external side of said funnel portion and extending longitudinally thereof, the combination further comprising a clamp member slidably engageable with said funnel portion, said clamp member having a pair of closely adjacent walls for depressing said chamber as said clamp member slides inwardly along said funnel portion.

4. In combination, a catheter comprising an elongated flexible shaft having a proximal end and a distal end, a main lumen extending longitudinally through said shaft, an inflatable balloon on said shaft adjacent the distal end thereof, an inflating lumen extending longitudinally of said shaft and communicating with said balloon, a funnel portion at the proximal end of said shaft for receiving a connecting tube, built-in, depressible, fluid-containing reservoir located adjacent said funnel portion and communicating with said inflating lumen, whereby depressing said reservoir forces the fluid contained therein through said inflating lumen to said balloon to inflate the latter, said inflating reservoir comprising a chamber extending peripherally around said funnel portion, the combination further comprising a connecting tube having a conical end portion snugly engageable within said shaft funnel portion so as to automatically depress said chamber and inflate said balloon upon introduction of said conical end portion into said funnel portion.

5. The combination of claim 4 further characterized in that said catheter is of rubber construction and said inflating fluid is silicone oil.

6. The combination of claim 4 further characterized in that said catheter is of rubber construction and said inflating fluid is glycerine.

7. The combination of claim 4 further characterized in that said catheter is of rubber construction and said inflating fluid is polyalkylene.

8. A catheter comprising an elongated flexible shaft having a proximal end and a distal end, a main lumen extending longitudinally through said shaft, an inflatable balloon on said shaft adjacent the distal end thereof, an inflating lumen extending longitudinally of said shaft and communicating with said balloon, a funnel portion at the proximal end of said shaft for receiving a connecting tube, and a depressible, fluid-containing reservoir located adjacent said funnel portion and communicating with said inflating lumen, said reservoir and lumen being defined by an integral one-piece construction wherein the fluid contained in said reservoir is permanently sealed and constitutes a permanent part of said catheter, whereby depressing said reservoir forces the fluid contained therein through said inflating lumen to said balloon to inflate the latter.

9. The catheter of claim 8 further characterized in that said shaft, balloon and reservoir are of rubber construction, and said fluid is silicone oil.

References Cited in the file of this patent
UNITED STATES PATENTS

| | | |
|---|---|---|
| 1,235,142 | Ichilian | July 31, 1917 |
| 2,480,041 | Myller | Aug. 23, 1949 |

FOREIGN PATENTS

| | | |
|---|---|---|
| 439,636 | France | Apr. 13, 1912 |

Disclaimer 3,044,468.—*William Clifford Birtwell*, North Scituate, R.I. CATHETER HAVING BUILT-IN INFLATION MEANS. Patent dated July 17, 1962. Disclaimer filed Dec. 8, 1965, by the assignee, *Davol Rubber Company*.

Hereby enters this disclaimer to claim 2 of said patent.

[*Official Gazette May 10, 1966.*]